No. 870,357. PATENTED NOV. 5, 1907.
J. W. GOULDING.
WASHING MACHINE FOR BRICK MOLDS.
APPLICATION FILED JULY 5, 1907.

Witnesses
Stuart Hilder.
George M. Anderson.

Inventor
J. W. Goulding
By E. W. Anderson
his Attorney

UNITED STATES PATENT OFFICE.

JOHN W. GOULDING, OF TRENTON, NEW JERSEY.

WASHING-MACHINE FOR BRICK-MOLDS.

No. 870,357.  Specification of Letters Patent.  Patented Nov. 5, 1907.

Application filed July 5, 1907. Serial No. 382,347.

*To all whom it may concern:*

Be it known that I, JOHN W. GOULDING, a citizen of the United States, and a resident of Trenton, in the county of Mercer and State of New Jersey, have made a certain new and useful Invention in Washing-Machines for Brick-Molds; and I declare the following to be a full, clear, and exact description of the same, such as will enable others skilled in the art to which it appertains to make and use the invention, reference being had to the accompanying drawings, and to letters or figures of reference marked thereon, which form a part of this specification.

Figure 1:
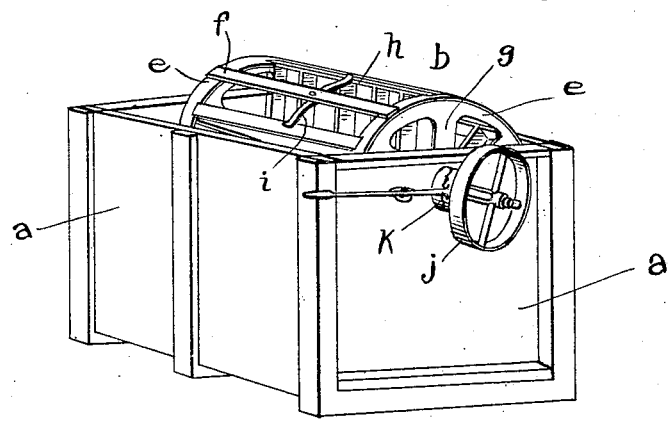
Figure 2:
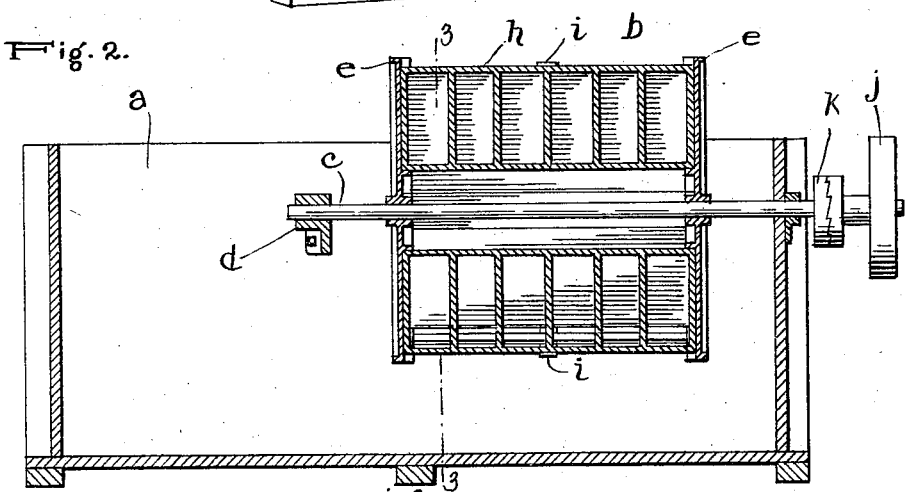
Figure 3:
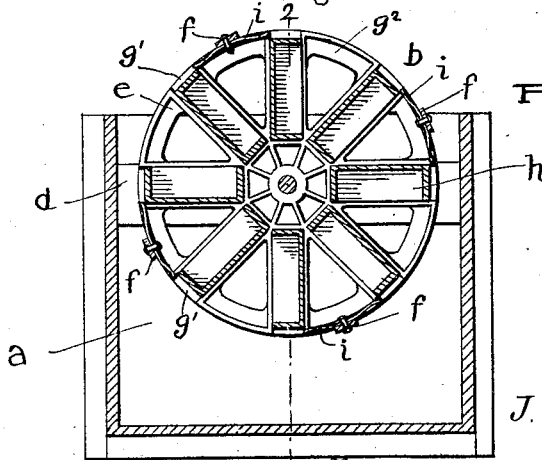

Figure 1 is a perspective view of the invention. Fig. 2 is a section on the line 2—2 Fig. 3. Fig. 3 is a section on the line 3—3 Fig. 2.

The invention relates to washing machines for brick molds used for making bricks of soft plastic material, and it consists in the novel construction and combinations of parts as hereinafter set forth.

In the accompanying drawings, illustrating the invention, the letter $a$, designates a tank or casing of liquid-tight character suitably reinforced, seven feet long, three feet in height and three feet in depth and open at the top, although these dimensions are not essential. In this tank is arranged a rotary wheel $b$, having a horizontal shaft $c$, provided with bearings in one of the end walls of the tank and in a horizontal transverse bar $d$, of the tank, leaving one end portion of the tank free of obstruction, as shown, to facilitate pouring water therein.

The rotary wheel $b$, is composed of two circular skeleton form heads $e$, usually formed of cast-iron and connected by four longitudinal brace bars $f$, having bolt connection at their end portions with the peripheries of such heads. Each head $e$, has eight radial spokes $g$, having each a radial groove $g'$, in its inner face, the parts between the peripheral portions $g^2$, of the wheels and the spokes being left open for free admission of water. In the grooves $g'$, which are arranged oppositely to each other in the opposite heads, are received the brick molds, indicated at $h$, which slide freely therein, being held from lateral movement by the flanges or edge walls of the grooves, and from endwise movement by the bowed leaf springs $i$, carried each at the central portion of one of the longitudinal brace bars $f$. Each spring has engagement at its ends with the outer edge walls of two adjacent brick molds. When the molds are to be inserted in position or removed from the machine the springs are turned upon their attachment bolts out of the way.

The horizontal shaft of the rotary wheel carrying the molds is extended outside the tank or casing at one end, such end extension carrying a driving pulley $j$, and a clutch $k$.

Having thus described my invention, what I claim and desire to secure by Letters Patent is:

1. A washing machine for brick molds including a tank, a rotary wheel in said tank composed of opposite heads having radial grooves in their inner faces adapted to receive the molds, and means for engagement with the outer faces of such molds to retain them in position.

2. A washing machine for brick molds including a tank, a rotary wheel in such tank composed of opposite heads having radial grooves in their inner faces adapted to receive the molds, longitudinal brace bars connecting such heads and means carried by such brace bars for engagement with the outer faces of the molds to retain them in position.

3. A washing machine for brick molds including a tank, a rotary wheel in such tank composed of opposite heads having radial grooves in their inner faces adapted to receive the molds, brace bars connecting said heads and spring devices carried by said brace bars and capable of engagement with such molds to retain them in position.

In testimony whereof I affix my signature, in presence of two witnesses.

JOHN W. GOULDING.

Witnesses:
ELWOOD W. MOORE, Jr.,
GEO. W. MACPHERSON.